United States Patent [19]
Mery

[11] Patent Number: 5,263,554
[45] Date of Patent: Nov. 23, 1993

[54] DISK-BRAKE MOTOR SUBASSEMBLY EQUIPPED WITH A MECHANICAL ACTION

[75] Inventor: Jean-Claude Mery, Pavillons-Sous-Bois, France

[73] Assignee: Bendix Europe Services Techniques, Drancy, France

[21] Appl. No.: 881,119

[22] Filed: May 11, 1992

[30] Foreign Application Priority Data

May 28, 1991 [FR] France .................. 91 06376

[51] Int. Cl.⁵ .............................. F16D 55/08
[52] U.S. Cl. ..................... 188/72.7; 188/72.2; 188/70 B; 192/44
[58] Field of Search ........... 188/71.4, 71.8, 72.2, 188/72.3, 72.7, 73.43, 73.44, 196; 192/70, 44, 45

[56] References Cited

U.S. PATENT DOCUMENTS

| | | | |
|---|---|---|---|
| 3,239,033 | 3/1966 | Walker | 188/71.4 |
| 3,245,499 | 4/1966 | Kershner | 188/71.4 |
| 3,952,843 | 4/1976 | Campbell et al. | 188/71.4 |
| 4,454,933 | 6/1984 | Hunnicutt et al. | 188/72.7 |
| 4,653,614 | 3/1987 | Price et al. | 188/72.2 |
| 4,715,479 | 12/1987 | Buckley | 188/71.8 |
| 5,038,895 | 8/1991 | Evans | 188/72.7 |

FOREIGN PATENT DOCUMENTS

| | | |
|---|---|---|
| 0209271 | 1/1987 | European Pat. Off. . |
| 863009 | 1/1953 | Fed. Rep. of Germany . |
| 3222741 | 12/1983 | Fed. Rep. of Germany . |

Primary Examiner—Robert J. Oberleitner
Assistant Examiner—Chris Schwartz
Attorney, Agent, or Firm—Larry J. Palguta; Ken C. Decker

[57] ABSTRACT

The invention relates to a disc-brake motor subassembly comprising at least one piston (10), which can be controlled by a mechanical subassembly having first and second plates (40, 48), one of which is actuated in rotation, these two plates bearing mutually faced indentations (54, 56) in which is accommodated at least one ball (52), the indentations being provided in the axial direction of the plates with a slope which allows the conversion of the rotation of a first plate into axial displacement of the second plate in order to control the piston (10). According to the invention, in the course of the rotation the ball (52) follows a trajectory, the distance of each of the points of which from the axis of the plates (40, 48) is variable.

3 Claims, 2 Drawing Sheets

DISK-BRAKE MOTOR SUBASSEMBLY EQUIPPED WITH A MECHANICAL ACTION

The present invention relates to a brake motor subassembly, more particularly for a disk brake, of the type comprising a control piston bearing on a screw extended on the side opposite to the control piston by a first plate immobilized in rotation relative to the body of the subassembly and capable of being pushed towards the control piston by a second plate, actuated in rotation from the outside, via balls accommodated between the two plates and rolling in indentations in these plates, these indentations having slopes to convert the relative rotation of the two plates into a relative translation, and providing the balls with a centripetal trajectory.

The necessity of a reduced travel of the cable which, via a lever, actuates the second plate in rotation, while at the same time providing the control piston with the force necessary for emergency braking of the vehicle, has led to a search for means of varying the ratio between the angle of rotation of the second plate and the forward travel of the control piston. Indeed, this ratio should increase in the course of the rotation, this being justified by the fact that the start of the rotation of the second plate serves above all to take up the play without any appreciable resisting force, whereas the latter increases very greatly towards the end of the rotation.

It is known, in particular from Patent DE 863,009, to provide indentations which provide the balls with a centripetal trajectory which proceeds along a straight line.

The present invention is based on the fact that such an embodiment has been found to correspond to a space requirement which is not conducive to the design of high-efficiency brake motors, and has as its object the reduction of this space requirement with a view to optimizing this efficiency.

To this end, the brake motor subassembly in accordance with the invention is essentially characterised in that the indentations have, in the plane of the plates, a non-zero curvature and a concavity turned towards the inside of the plates.

These indentations preferably form an arc of a circle but may optionally describe a spiral.

The invention will now be described by way of example with reference to the accompanying drawings in which.

Figure 1:
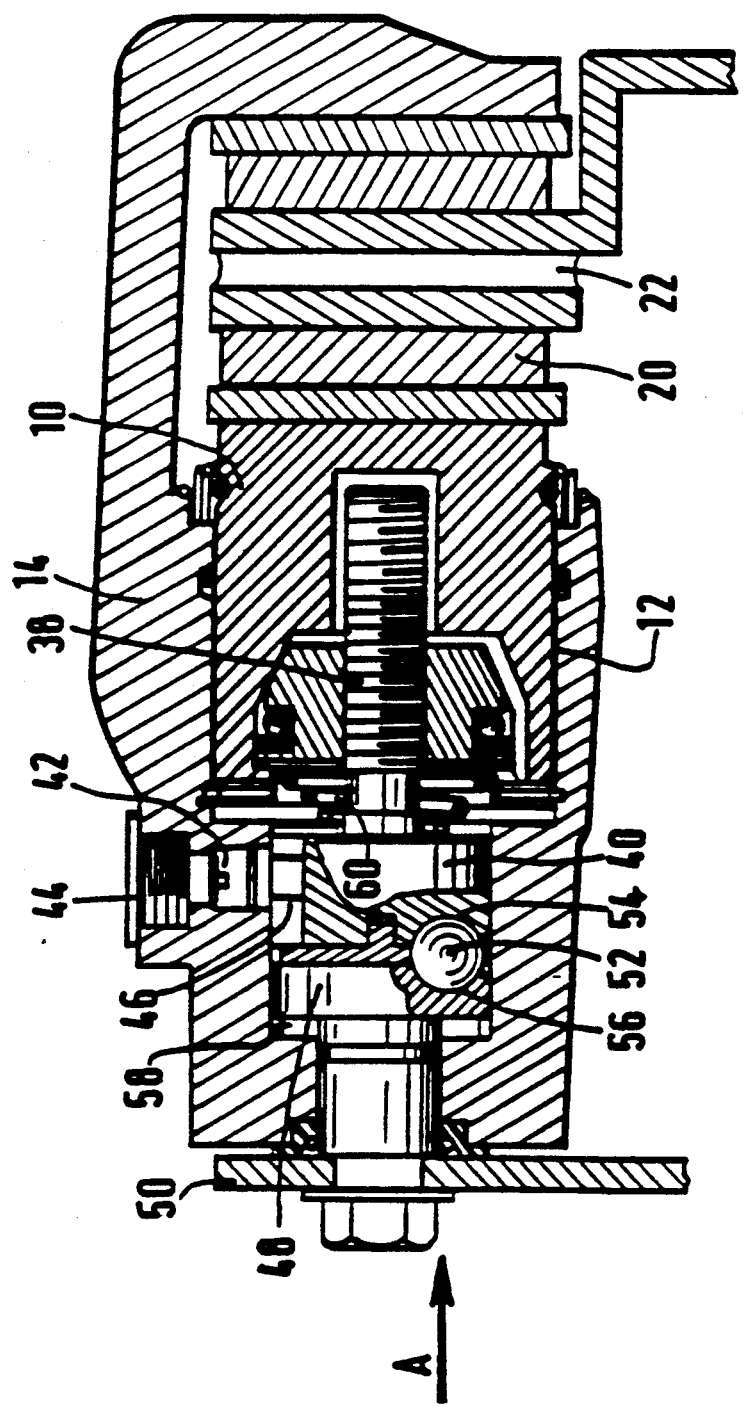
FIG. 1 is a schematic view in half-section of a disk brake of known type, having a mechanical actuating device composed of two plates between which are accommodated one or more balls.

FIG. 1 shows a brake motor subassembly of the abovementioned type comprising a control piston 10 accommodated in a stepped bore 12 and intended to push a friction element 20 in order to bring the latter into frictional contact with a rotary braking member, for example a disk 22.

Figure 2:
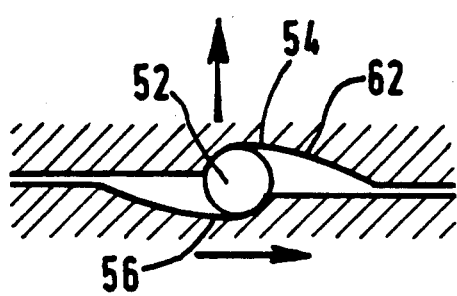
FIG. 2 is a view in circumferential section of the accommodation of a ball in the two plates, showing the abovementioned slope for converting the movement.

The control piston 10 interacts with a threaded spindle 38 coupled to a mechanical actuating device composed of a plate-shaped extension 40 of the screw 38 immobilized in rotation relative to the body 14 of the brake subassembly by a peg 42 held in place by a plug 44 and projecting into a groove 46 of the plate 40, and of a second plate 48 which can be actuated in rotation by an external lever 50, the two plates being separated from one another by at least one ball 52 rolling in at least one indentation 54, 56 of each plate, shown in detail in FIG. 2.

These indentations have a slope 62 on which the balls 52 roll.

The second plate is braced against a needle-roller thrust bearing 58 rolling on the bottom of the bore 12 by a spring 60, via the first plate 40 and the balls 52.

The mechanical actuating device acts as follows:

The rotation of the lever 50, transmitted to the second plate 48, makes the balls 52 roll in the indentations 54, 56 of the first and second plates. The balls rolling on the slopes 62 separate the plates from one another, with a ratio between the angle by which the second plate turns and the distance by which the first plate is displaced axially which is a direct function of the angle of these slopes relative to the plane of the plates. The greater this angle, the greater is the axial displacement of the first plate.

Figure 3:
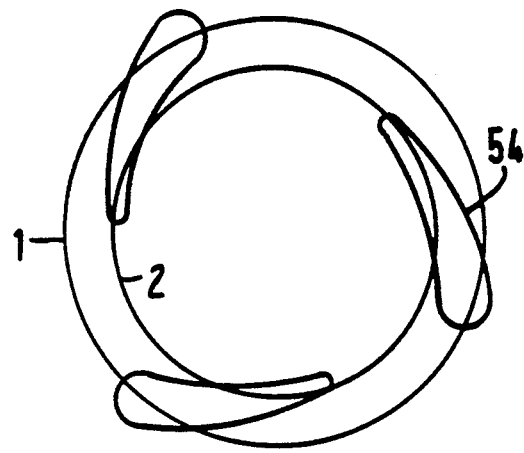
FIG. 3 is a front view in accordance with arrow A in FIG. 1 of the indentations according to the invention.
Figure 4:
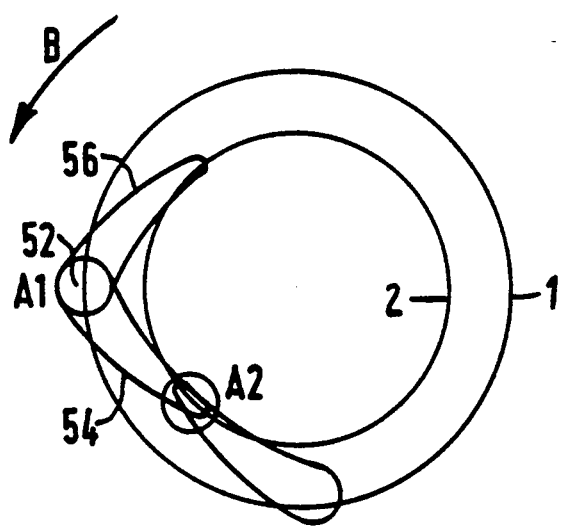
FIG. 4 shows in superimposed fashion the two plates with indentations according to the invention, in between which there is a ball, the indentation of the second plate being represented in initial and final positions of rotation.

With the object of keeping to a minimum the total angle of rotation of the second plate 48, i.e. the angle of rotation of the lever 50 and the displacement of its control cable while at the same time maintaining the force of separation from the first plate to obtain effective braking, it is known to place the balls initially on a circle 1 of large diameter for a large displacement and a small resistance of the first plate and, at the end of rotation of plate 48, in placing these balls on a circle 2 of smaller diameter for the purpose of increasing the resultant force (see FIGS. 3 and 4).

The indentations 54, 56 are thus not aligned along a circumference but made to diverge from this circumference in centripetal manner.

However, to further increase the efficiency of the brake application, the invention proposes, as illustrated in FIG. 3, to provide the indentations with a curved shape, the concavity of which is turned towards the inside of the plate.

Indeed, this arrangement has the twin advantage of reducing the frictional forces and of allowing a further reduction in the surface area of the rotating plates in so far as the free zone in the center of the plates, which should have a minimum non-zero surface area to allow the centering of the latter, is substantially larger, for a given diameter of the plates, in an embodiment in accordance with the invention, than in an embodiment in accordance with the prior art.

FIG. 4 shows the two, first and second, plates, having the indentations according to the invention, and the displacement of a ball in the course of the rotation of the second plate in the direction of arrow B, i.e. the direction of actuation of the lever 50 for the braking action, between its starting point A1 on the larger circumference and its point of arrival A2 on the smaller circumference, the ball remaining at all times at the intersection of the two indentations.

For a constant torque applied in the course of the rotation of the second plate, the force applied to the balls, that is to say to the first plate in the axial direction, increases in the course of the rotation since the radius of the point at which this force is applied decreases, the path travelled by the first plate itself decreasing at the same time.

This arrangement thus leads to a mechanical actuating device in which the rotary movement (of the lever 50) is converted into axial displacement (of the first plate 40) with a variable ratio, this device having an improved efficiency as regards the increasing of the ratio between the output force and the input force and the reduction of the corresponding travel of the actuating element.

Although the present invention has been described in relation to one particular embodiment, it is not limited by this but, on the contrary, is susceptible of modifications and variants which will be apparent to the person skilled in the art.

I claim:

1. A disk-brake motor subassembly, comprising at least one piston which can be controlled by a mechanical subassembly having first and second plates one of which is actuated in rotation and the other fixed, the plates having mutually facing indentations in which is accommodated at least one ball, said indentations being provided, in an axial direction of the plates, with a slope which allows the conversion of the rotation of a first plate into axial displacement of the second plate in order to control the piston and providing the ball with a centripetal trajectory, and the indentations having in a plane of the plates a non-zero curvature and a concavity turned radially inwardly of the plates.

2. The subassembly according to claim 1, characterized in that the indentations form an arc of a circle in the plane of the plates.

3. The subassembly according to claim 1, characterized in that the indentations follow a spiral in the plane of the plates.

* * * * *